Aug. 20, 1946.  R. B. SPRINKEL  2,406,261
DUAL CONTROL OPERATING MECHANISM FOR MOTOR VEHICLES
Filed Oct. 30, 1944  3 Sheets-Sheet 1
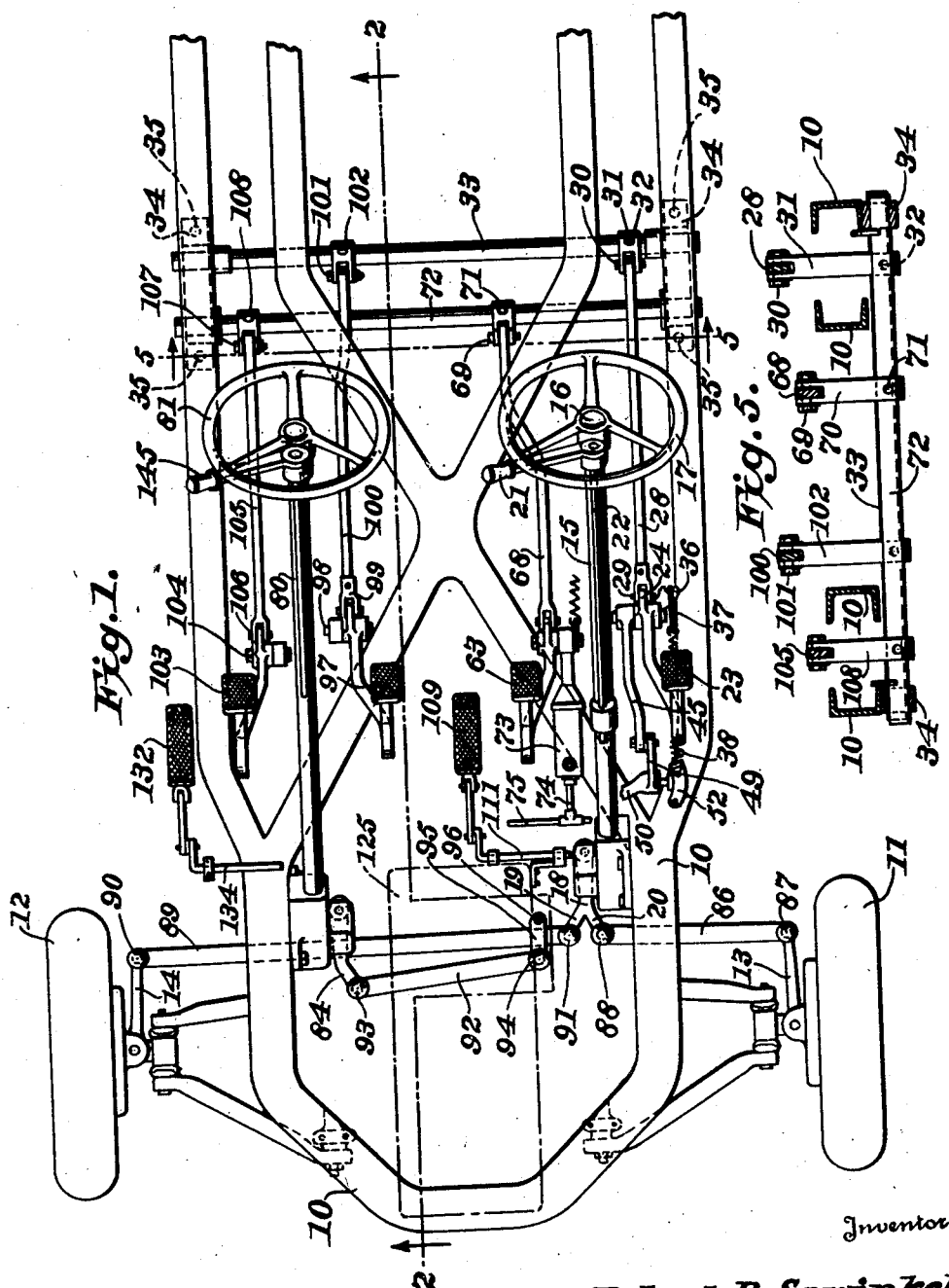
Inventor:
Robert B. Sprinkel,

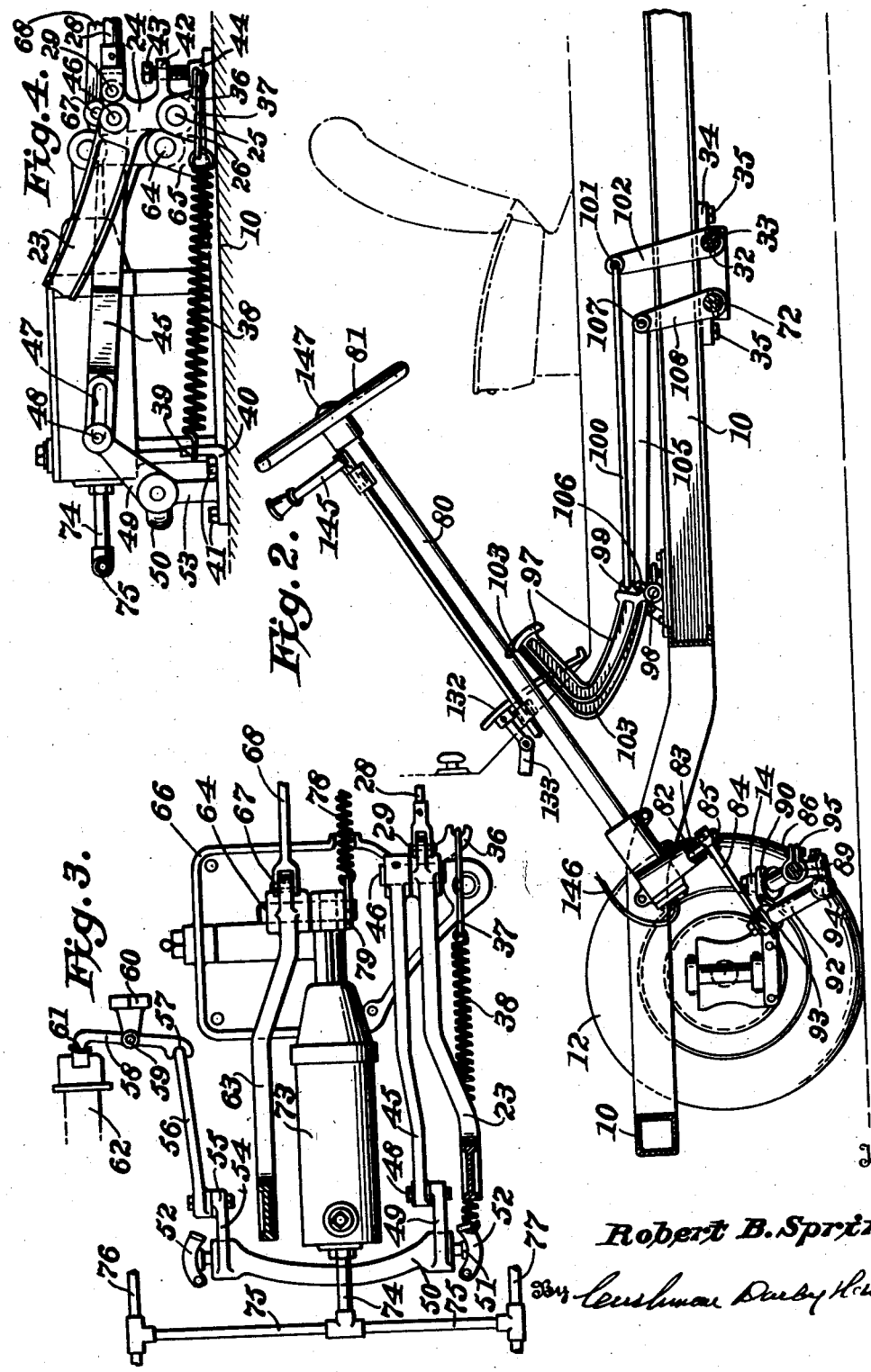

Aug. 20, 1946.   R. B. SPRINKEL   2,406,261
DUAL CONTROL OPERATING MECHANISM FOR MOTOR VEHICLES
Filed Oct. 30, 1944   3 Sheets-Sheet 3
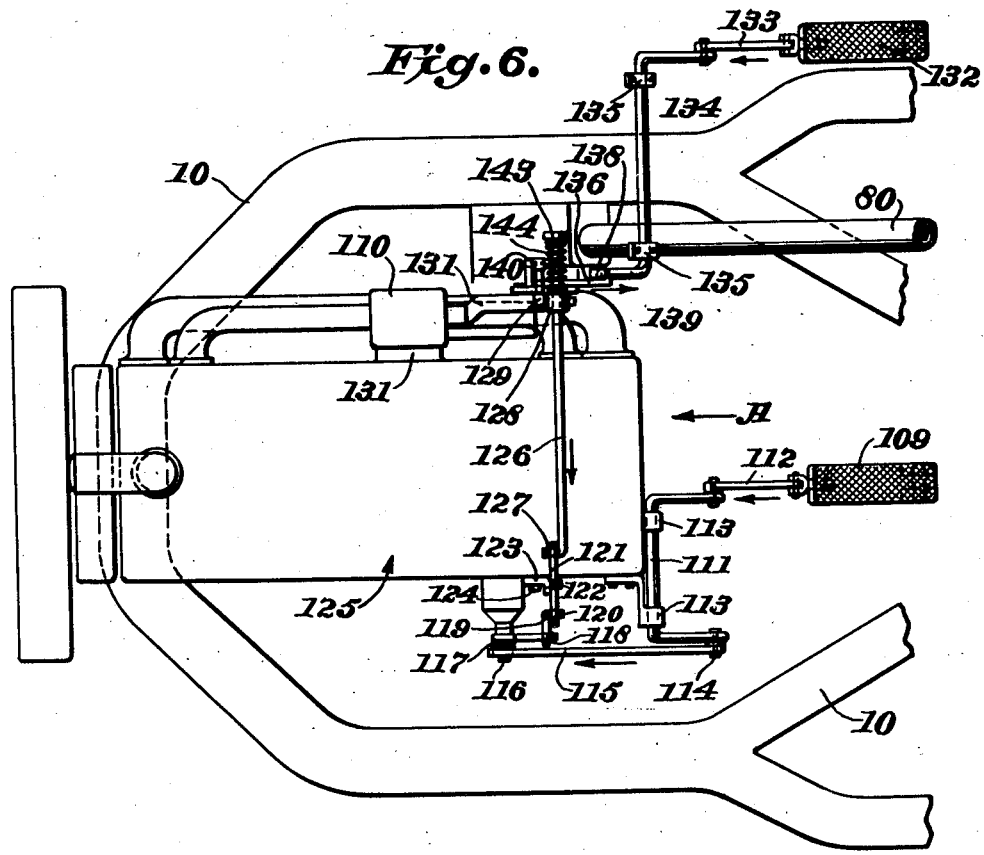
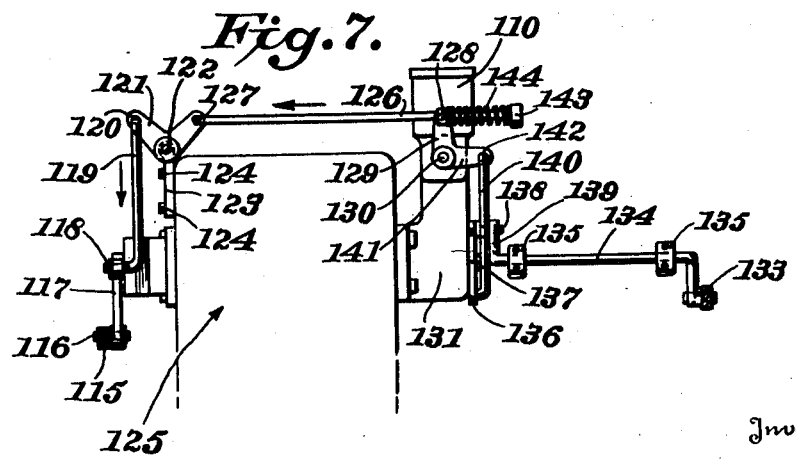
Inventor:
Robert B. Sprinkel,
By Cushman Darby Cushman
Attorneys Patented Aug. 20, 1946

2,406,261

UNITED STATES PATENT OFFICE 2,406,261

DUAL CONTROL OPERATING MECHANISM
FOR MOTOR VEHICLES

Robert B. Sprinkel, Washington, D. C.

Application October 30, 1944, Serial No. 561,077

2 Claims. (Cl. 180—77)

The present invention relates to a new and improved dual control mechanism for operating and steering motor vehicles.

An essential feature of the invention consists in providing simple, efficient and positive dual control means for automobiles and the like, which comprises a minimum number of parts that can economically be installed on any type of automobile at a minimum expenditure of time and labor. The dual control means includes a primary operating and steering mechanism on the driver side of the vehicle and an auxiliary operating and steering mechanism on the non-driving or auxiliary driver side of the vehicle. The parts are constructed and arranged so that when the vehicle is being operated by either the driver or the auxiliary driver, the control of the operation and steering of the vehicle can at any time be taken over by the other driver. The dual control mechanism is especially suitable for use in instructing operators or novices to drive a car, and provides means whereby the instructor can immediately take over control to avoid an accident or collision by disconnecting the motor from the wheels and applying the brakes in order to render inoperative the control of the car by the driver.

The dual control mechanism may also be installed as standard equipment or readily connected to cars so that the occupants of the front seat may interchangeably take over the driving of the car without the inconvenience of changing places, when the driver for any reason wishes to relinquish control of the car. The dual control mechanism also provides safety means wherein the occupant of the front seat next to the driver can, in an emergency such as to avoid an accident or collision, immediately assume control of the vehicle by actuation of an auxiliary clutch and an auxiliary brake pedal. Additionally, the accelerator pedals may be selectively operated to control the flow of gasoline mixture to the engine.

Other objects and advantages of the invention will become apparent from the following description when taken in conjunction with the accompanying claims and drawings.

Referring to the drawings in which is shown a preferred embodiment of the invention.

Figure 1 is a schematic plan view showing the dual control mechanism associated with the chassis frame of an automobile.

Figure 2 is a sectional view taken substantially along the line 2—2 of Figure 1 and looking in the direction of the arrows.

Figure 3 is a detailed plan view of a part of the mechanism.

Figure 4 is a side view of Figure 3.

Figure 5 is a transverse view taken substantially along the line 5—5 of Figure 1.

Figure 6 is a detailed plan view showing the operative connection of the accelerator pedals with the carburetor.

And Figure 7 is a transverse view looking in the direction of the arrow A in Figure 6.

Referring to the drawings in which like numerals indicate like parts in the several views, 10 designates the chassis frame of an automobile or other suitable motor vehicle, 11 and 12 the front wheels, and 13 and 14 the steering knuckles.

On the left side of the automobile adjacent the front seat is a steering mechanism of conventional type, which includes a steering column 15 in which rotatably is mounted a steering shaft 16 having the steering wheel 17 secured to the upper end thereof. The lower end of the shaft 16 is operatively connected through suitable gear and pinion mechanisms, not shown, to a pitman 18 having arms 19 and 20 (Fig. 1). A gear shift lever 21 is connected to a rod 22 which in turn is connected to a suitable gear mechanism, not shown. A foot clutch pedal 23 is provided with an integral depending arm 24 (Fig. 4) which is pivoted as at 25 to a bracket 26 fastened to one side of the chassis frame 10. A longitudinal rod 28 is connected at its forward end as at 29 to the arm 24 and has its rear end connected as at 30 to a link 31. The lower end of the link 31 is fastened as at 32 to a transversely disposed rocker shaft 33 mounted in bearing members 34 secured by the bolts 35 to the under side of the chassis frame 10. A lug 36 extends laterally from the pedal 23 (Fig. 3) and carries a link 37 to which is connected at one end, a coil spring 38 that has its opposite end fastened to a flange 39 on a base member 40 fastened by the bolts 41 to the chassis frame 10. The tension of the spring 38 acts to normally raise the foot pedal 23. A flange 42 extends outwardly from the arm 24 and has a threaded opening for receiving a complementary threaded bolt 43 (Fig. 4), the lower end of which is arranged to engage a plate 44 on the chassis frame 10 so as to constitute a stop for limiting the movement of the clutch pedal 23 in a clockwise direction. A longitudinally extending link 45 is connected at its rear end by a pin 46 to the pedal 23 and has at its opposite end an elongated slot 47 in which is slidably mounted a lug 48 carried by an arm 49 of a rocker shaft 50. The rocker shaft 50 extends transversely of the frame of the car and may be provided at its ends with concave surfaces or balls 51 arranged to fit in complementary curved sockets formed in the supporting members 52 carried by the spaced arms 53. One of the arms 53 extends upwardly from the base 40 and the other is suitably connected to the frame of the vehicle. An arm 54 parallel with the arm 49 extends outwardly from the rocker shaft 50 and is connected as at 55 to link 56 which in turn engages as at 57 one end of an operating lever 58 which is pivoted at 59 to a bracket 60 on the frame. The opposite end of the lever 58 contacts as at 61 with a part of the clutch mechanism 62 so that the parts when in normal position (Fig. 3) have the clutch pedal 23 in operative engagement with the clutch 62.

A foot brake pedal 63 is connected by a shaft 64 to an upstanding bracket member 65 mounted on a base plate 66 (Fig. 3) carried by the chassis frame 10. The brake pedal 63 is also connected at 67 to one end of a rod 68, the opposite end of which is connected as at 69 to an arm 70 secured as at 71 to a transverse rotatable shaft 72 fastened to the side frame by the bearing members 34 and bolts 35. A master cylinder 73 is provided with a reciprocating plunger or piston rod 73' which is operatively connected to the foot pedal 63 through the shaft 64. A pipe 74, having a branch connection 75 with pipes 76 and 77, supplies the braking fluid from the master cylinder 73 to the front and rear brakes of the car (Fig. 3). Operation of the foot pedal 63 moves the plunger 73' to force the braking fluid from the cylinder 73 through the pipes 74, 75, 76 and 77 to the brakes to apply the same, and release of the foot pedal 63 allows the braking fluid to be returned to the cylinder 73. The brake pedal 63 is substantially similar in construction to the clutch pedal 23 and is normally maintained in its upward or released position by a coil spring 78 connected at one end as at 79 to the shaft 64 and having its opposite end attached to a fixed member on the car.

The front seat of the car adjacent the driver or operator, is provided with an auxiliary steering column 80 parallel to the steering column 15 and receives a steering shaft to which is connected at its upper end an auxiliary steering wheel 81 (Fig. 2) and carries at its lower end a suitable gear mechanism, not shown, which meshes with a complementary gear or pinion on a shaft 82 that extends outwardly from the housing 83 so as to be connected to a pitman 84. The exposed end of the shaft 82 is threaded to receive a retaining nut 85 for clamping the parts in position. The steering knuckles 13 and 14 of the front wheels are operatively connected to the steering wheel 17 by a short tie rod 86 having at one end a universal joint connection as at 87 with the steering knuckle 13 (Fig. 1) and a universal joint connection 88 with the arm 20 of the pitman 18. A long tie rod 89 is similarly connected as at 90 with the steering knuckle 14 and at 91 with the arm 19 of the pitman 18. In order to effect turning of the front wheels by the auxiliary steering wheel 81 an inclined auxiliary rod 92, substantially the same length as the rod 86, is attached at its upper end as at 93 by a universal joint connection to the pitman 84 and at its lower end as at 94 to a clamp 95 secured to the long tie rod 89 by the bolts 96 adjacent the pitman 18. The lower end of the auxiliary steering column 80 extends forwardly a slightly greater distance than the steering column 15 so as not to interfere with the oil pump casing, not shown, and is connected to the pitman 84 at a point in advance of the connection of the column 15.

An auxiliary clutch pedal 97 (Fig. 2), similar in construction to the clutch pedal 23, is located adjacent the feet of the occupant of the car next to the driver, and is pivotedly supported as at 98 by a bracket on the frame 10. The pedal 97 is connected as at 99 with the forward end of a rod 100, and the rear end of the rod 100 is connected as at 101 to a link 102 on the transverse rod 33, so that actuation of either of the clutch pedals 23 or 97 will cause rotation of the shaft 33.

Thus it will be seen that the common connections of the auxiliary clutch pedal 97 and pedal 23 with the transverse shaft 33 and the connections of the auxiliary brake pedal 103 and pedal 63 with the transverse shaft 72 will simultaneously cause the actuation of the clutch pedals when one of these pedals is depressed and, likewise movement of the brake pedals when one of them is actuated. The steering wheel 17 and its associate parts together with the clutch pedal 23 and brake pedal 63 adjacent the driver seat of the car, constitute the primary operating and steering mechanism while the auxiliary steering wheel 81 together with the auxiliary clutch pedal 97 and auxiliary brake pedal 103 provides an auxiliary operating and steering mechanism disposed on the non-driving or auxiliary driver's side of the vehicle. In other words dual means operatively connected to the clutch mechanism and to the brake mechanism of the car are provided for releasing the clutch or applying the brakes and for steering the car when either the primary operating and steering mechanism under the control of the driver are operated or when the auxiliary operating and steering mechanism under the control of the occupant of the front seat adjacent the driver, are actuated.

An accelerator pedal 109 (Fig. 6) is operatively connected to the carburetor 110 in any suitable manner and as shown, is attached to a substantially U-shaped rocker arm 111 by a link 112. The rocker arm 111 is rotatably supported in spaced bearings or brackets 113 and is connected as at 114 to one end of a link 115. The opposite end of the link 115 is connected as at 116 (Fig. 7) to a depending arm of a bell crank 117 which in turn has its upper horizontal arm connected at 118 to a link 119 connected at 120 to a bell crank 121 pivoted at 122 to a bracket 123 secured at 124 to one side of the engine block 125. A transverse rod 126 is connected at one end as at 127 to the bell crank 121 and adjacent its opposite end is slidably connected as at 128 with the arm of a bell crank 129 pivoted by a rotatable shaft 130 to a bracket 131 that extends outwardly from the engine block. The shaft 130 preferably is operatively connected to a suitable valve not shown in the carburetor 110, for controlling the flow of the combustible mixture to the engine. An auxiliary accelerator pedal 132 is also operatively connected to the carburetor 110 through a link 133 and a substantially Z-shaped rocker arm 134 secured to the car by the spaced straps 135. A bell crank 136 is pivoted as at 137 to the bracket 131 and has its upper arm connected as at 138 to the outwardly bent end portion 139 of the rocker arm 134. The other arm of the bell crank 136 is connected by a vertical link 140 to the horizontal arm 141 of the bell crank 130 as at 142 so that the flow of the combustible mixture through the carburetor 110 may be controlled either by the actuation of the primary accelerator 109 or the auxiliary accelerator 132.

The free end of the transverse rod 126 is preferably provided with a head or collar 143 between which and the vertical arm of the bell crank 129 is confined a coil spring 144 to provide a yieldable connection.

The auxiliary steering column 80 may have associated therewith a gear shift lever 145 so that the auxiliary driver may take over at any time complete control of the operation and steering of the vehicle. In the event the gear shift lever 145 is omitted the auxiliary driver may conveniently use his left hand to actuate the lever 21 to shift the gears when he has complete control of the car. Means such as wires 146 (Fig. 2) may extend from a horn or other suitable electrical signal device, not shown, so as to pass through either or both of the steering columns 15 or 80 and be connected to a button 147 adjacent each of the steering wheels 17 and 81 respectively.

Thus, a simple, efficient and inexpensive dual control mechanism is provided which may be used to instruct operators or beginners, and which will allow either occupant of the front seat to take over the control and operation of the car. Assuming that the dual control mechanism is used for instruction purposes, it will be seen that the instructor may at any time assume control of the car by the simple expedient of actuating the auxiliary clutch pedal 97 and the auxiliary brake pedal 103 so as to disconnect the engine from the wheels of the vehicle and bring the car to a stop to avoid an accident or collision. The instructor may also assist the beginner or novice in the proper handling of the clutch, brake and accelerator pedals since when the instructor actuates any one of these pedals it will in turn cause a simultaneous movement to be imparted to the pedals under the control of the driver.

The dual control mechanism may be readily installed on a motor vehicle and since only a few additional parts are required, this change-over can be effected economically and at a minimum expenditure of time and labor. Consequently, it will be seen that should such mechanism be installed as standard equipment either occupant of the front seat may take over the operation and steering of the car without disturbing or interfering with the mechanism under control of the driver. This is a very desirable feature, particularly when driving long distances and also provides safety means which will allow the occupant of the front seat adjacent the driver, in an emergency to assume control of the vehicle in the event that the driver, for any reason, becomes physically incapacitated or to avoid a collision should the car get out of control of the driver.

It is to be understood that the form of the invention shown and described is merely illustrative of a preferred embodiment and that such changes may be made as fall within the purview of one skilled in the art without departing from the spirit of the invention and the scope of the claims.

I claim:

1. In combination with a motor vehicle, dual control means for operating and steering the vehicle, said means including a primary operating and steering mechanism on the driver side of the vehicle and an auxiliary operating and steering mechanism on the non-driving or auxiliary driver side of the vehicle, the primary operating and steering mechanism including a long steering rod connected to one of the front wheels and a short steering rod connected to the other front wheel, an auxiliary steering rod connected at one end to the long steering rod, and means operatively connecting the other end of the auxiliary steering rod to the auxiliary steering mechanism.

2. In combination with a motor vehicle, dual control means for operating and steering the vehicle, said means including primary braking, clutching, steering, and gas controlling mechanisms on the driver's side of the vehicle, and auxiliary braking, clutching, steering and gas controlling mechanisms on the auxiliary driver side of the vehicle, said primary and auxiliary mechanisms each including a clutch pedal, a brake pedal, a steering wheel and steering wheel linkage, and an accelerator pedal, a transverse rocker shaft connected to the sides of the vehicle, means operatively connecting the brake pedals to said shaft to effect movement of the brake mechanism upon the operation of any one of the brake pedals, a second transverse rocker shaft connected to the sides of the vehicle, means operatively connecting the clutching pedals to the second rocker shaft to actuate the clutch mechanism when any one of the clutch pedals is operated, means operatively connecting each of the accelerator pedals to the gas controlling mechanism to effect operation of the accelerator mechanism when any one of the accelerator pedals is operated, and means independently connecting the primary and auxiliary steering wheels to said steering wheel linkage, the parts being constructed and arranged so that when the vehicle is being operated by either one of the drivers, the control of the vehicle to brake, to clutch, to guide, and to control the flow of gas to the engine, can be taken over at any time by the other driver.

ROBERT B. SPRINKEL.